(No Model.)
J. A. STEWART.
PLOW.
No. 399,217. Patented Mar. 5, 1889.
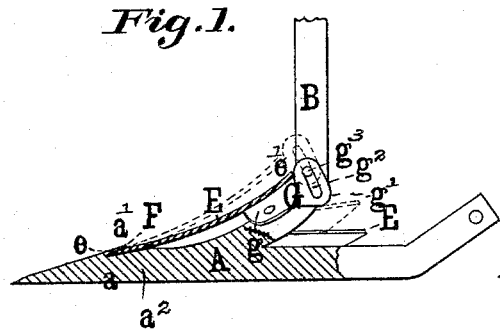
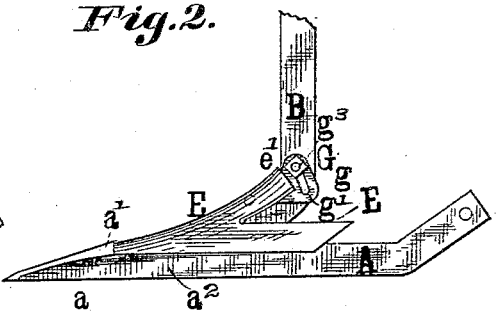
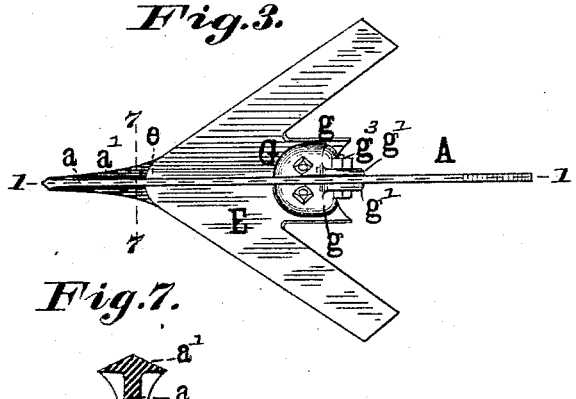
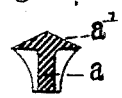
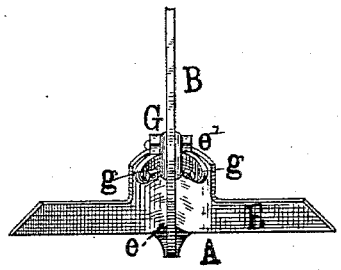
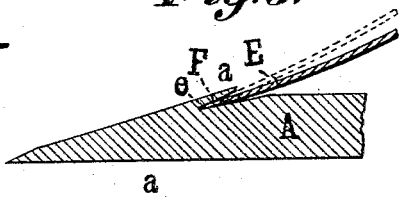
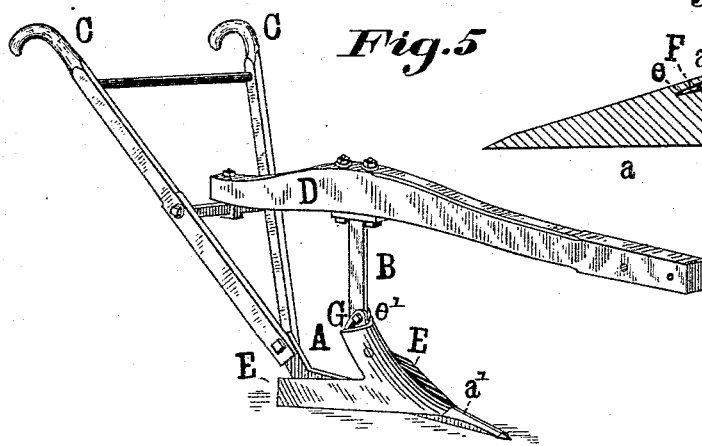
Witnesses:
N. B. Anderson.
B. J. Rex
Inventor:
John A. Stewart,
by C. D. Moody
atty

UNITED STATES PATENT OFFICE.

JOHN A. STEWART, OF HOUSTON, TEXAS, ASSIGNOR TO DEERE, MANSUR & CO., OF ST. LOUIS, MISSOURI.

PLOW.

SPECIFICATION forming part of Letters Patent No. 399,217, dated March 5, 1889.

Application filed April 4, 1887. Serial No. 233,582. (No model.)

*To all whom it may concern:*

Be it known that I, JOHN A. STEWART, of Houston, Texas, have made a new and useful Improvement in Plows, of which the following is a full, clear and exact description, and substantially as is hereinafter set forth and claimed, aided by the annexed drawings, making part of this specification, in which—

Figure 1 is a side elevation, partly in section, of the lower portion of the plow, the section being on the line 1 1 of Fig. 3. Fig. 2 is a side elevation of the lower part of the plow. Fig. 3 is a bottom view of the plow, the handles and beam not being shown. Fig. 4 is a rear elevation of the parts shown in Fig. 2. Fig. 5 is a view in perspective of the improved plow. Fig. 6 is a longitudinal section, upon an enlarged scale, of the forward end of the center bar and sweep; and Fig. 7 is a cross vertical section on the line 7 7 of Fig. 3.

The same letters of reference denote the same parts.

The style of plow-frame shown has a center bar, A, standard B, handles C C, and beam D, the standard rising from the center bar at a point thereon at or toward the forward end of the center bar, the handles being attached to the rear end of the center bar, and the beam being secured to the standard and also to the handles, substantially as represented, saving as modified by the improvement under consideration.

E represents the sweep. What is termed a "wing sweep" is shown, but what is known as a "solid sweep" may be used.

The center bar shown has three peculiarities. It is made to come below the level of the lower edge of the sweep E; it extends beyond the point $e$ of the sweep, as shown at $a$, and at its forward end it is provided with a lip, $a'$, which is integral with the main portion $a^2$ of the center bar. In the present application I do not lay claim, broadly, to the two first-named features, as they are set forth and claimed in a separate application for Letters Patent of even date herewith, filed by myself, jointly with other parties; but in combination with a sweep I do desire to claim them as the combination of a depressed center bar, as well as the combination of a depressed and extended center bar with a sweep having widely-extended wings, which is especially useful, as thereby the operation of a sweep-plow is greatly facilitated and a better result obtained than is with a sweep-plow whose center bar is not depressed nor extended. The bar A is preferably of uniform width throughout its length. The portion $a$ is beveled on the top, substantially as shown. The lip $a'$ at its forward end is as wide, or thereabout, as the center bar, and it widens toward its rear end, where, in conjunction with the main portion $a^2$ of the center bar, it forms a socket, F, in which is received the point $e$ of the sweep. The upper rear end, $e'$, of the sweep is adapted to be secured to the standard B, and by these means the sweep is held in position. The sweep is preferably made adjustable, so that it can be inclined more or less and the earth thereby thrown more or less, as may be desired. To this end, and as the most desirable means therefor, the sweep is attached to the standard by means of what is termed the "saddle" G. This piece is extended at $g\ g$ and thereby bolted to the sweep, and it is also provided with the lug or lugs $g'$ $g'$, which are slotted at $g^2$, and by means of the bolts $g^3$ the saddle is adjustably secured to the standard and, within a limited degree, higher or lower thereon, as preferred. The socket F and sweep-point $e$ are relatively fitted to permit of the described adjustment of the sweep upon the standard.

I claim—

1. In a plow, a longitudinal center bar extending below the base of the sweep and having the pointed nose and the fan-shaped lip, substantially as described.

2. In a plow, the combination of the center bar, the adjustable sweep, and the saddle, substantially as described.

JOHN A. STEWART.

Witnesses:
GEO. W. SUTHERLAND,
A. T. STEVENS.